United States Patent
Balmakhtar

(10) Patent No.: US 11,490,328 B1
(45) Date of Patent: Nov. 1, 2022

(54) DATA COMMUNICATION SYSTEM TO SERVE A USER EQUIPMENT (UE) OVER A THIRD GENERATION PARTNERSHIP PROJECT (3GPP) NETWORK CORE

(71) Applicant: T-Mobile Innovations LLC, Overland Park, KS (US)

(72) Inventor: Marouane Balmakhtar, Fairfax, VA (US)

(73) Assignee: Sprint Communications Company LP, Overland Park, KS (US)

( * ) Notice: Subject to any disclaimer, the term of this patent is extended or adjusted under 35 U.S.C. 154(b) by 0 days.

(21) Appl. No.: 17/233,044

(22) Filed: Apr. 16, 2021

(51) Int. Cl.
*H04W 48/18* (2009.01)
*H04W 12/06* (2021.01)

(52) U.S. Cl.
CPC .......... *H04W 48/18* (2013.01); *H04W 12/06* (2013.01)

(58) Field of Classification Search
CPC .............................. H04W 48/18; H04W 12/06
See application file for complete search history.

(56) References Cited

U.S. PATENT DOCUMENTS

| | | |
|---|---|---|
| 10,524,166 B2 | 12/2019 | Youn et al. |
| 10,897,701 B2 | 1/2021 | Niemi et al. |
| 10,945,103 B2 | 3/2021 | Shaw et al. |
| 2020/0053830 A1 | 2/2020 | Venkataraman et al. |
| 2020/0092758 A1 | 3/2020 | Youn et al. |
| 2020/0120585 A1 | 4/2020 | Kumar et al. |
| 2020/0228968 A1* | 7/2020 | Bernardos ............ H04W 48/18 |
| 2020/0280849 A1 | 9/2020 | Ito et al. |
| 2021/0306972 A1* | 9/2021 | Watfa ................... H04W 48/18 |
| 2022/0007184 A1* | 1/2022 | Ferdi .................... H04W 12/08 |
| 2022/0078692 A1* | 3/2022 | Stojanovski ...... H04W 36/0022 |
| 2022/0086744 A1* | 3/2022 | Youn ...................... H04W 4/40 |
| 2022/0116816 A1* | 4/2022 | Liang ................... H04W 12/06 |

FOREIGN PATENT DOCUMENTS

| | | |
|---|---|---|
| WO | 2019186504 A1 | 10/2019 |
| WO | 2020185949 A2 | 9/2020 |

OTHER PUBLICATIONS

3GPP; "3rd Generation Partnership Project; Technical Specification Group Services and System Aspects; System architecture for the 5G System (5GS); Stage 2 (Release 17)"; 3GPP TS 23.501; Mar. 2021; pp. 1-489; V17.0.0; 3GPP; Sophia Antipolis, France.

\* cited by examiner

*Primary Examiner* — Marcus Hammonds

(57) ABSTRACT

A data communication system serves a User Equipment (UE) over a Third Generation Partnership Project (3GPP) network core. In the data communication system, a 3GPP UE client exchanges authentication data with the 3GPP network core over a non-3GPP link. The 3GPP network core authenticates the 3GPP UE client, selects a network slice for the 3GPP UE client, and establishes an N1 link for the network slice over the non-3GPP link. The 3GPP UE client exchanging network signaling with the 3GPP network core for the network slice over the N1 link. The 3GPP UE client exchanges additional authentication data with the 3GPP network core over the non-3GPP link. The 3GPP network core selects another network slice for the 3GPP UE client and establishes another N1 link for the other network slice over the non-3GPP link. The 3GPP UE client exchanges additional network signaling with the 3GPP network core for the other network slice over the other N1 link.

20 Claims, 9 Drawing Sheets

DATA COMMUNICATION SYSTEM TO SERVE A USER EQUIPMENT (UE) OVER A THIRD GENERATION PARTNERSHIP PROJECT (3GPP) NETWORK CORE

TECHNICAL BACKGROUND

Wireless communication networks provide wireless data services to wireless user devices. Exemplary wireless data services include internet-access, media-streaming, social-networking, and machine-control. Exemplary wireless user devices comprise phones, computers, vehicles, robots, and sensors. The wireless user devices execute user applications to support and use the wireless data services. For example, a phone may execute an internet access application that to communicate with a data network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), IEEE 802.3 (ENET), and Low-Power Wide Area Network (LP-WAN). The wireless access nodes exchange network signaling and user data with network elements that are often clustered together into wireless network cores. The network elements comprise Non-Third Generation Partnership Project Interworking Functions (N3IWFs), Access and Mobility Management Functions (AMFs), Session Management Functions (SMFs), User Plane Functions (UPFs), Policy Control Functions (PCFs), Network Exposure Functions (NEFs), Application Functions (AFs), and the like.

Some wireless user devices comprise Third Generation Partnership Project (3GPP) devices that communicate with the wireless network cores over the wireless access nodes using 3GPP protocols like 5GNR and LTE and non-3GPP protocols like WIFI and ENET. Other wireless user devices comprise non-3GPP only devices that communicate with the wireless network cores over wireless access nodes using non-3GPP protocols like WIFI and ENET. At present, a 3GPP UE is limited to two N1 signaling links with a wireless network core, one 3GPP link and one non-3GPP link. 3GPP UEs are unable to establish multiple N1 links over the same type of protocol. Consequently, non-3GPP UEs are unable to establish multiple N1 links. Unfortunately, non-3GPP UEs cannot effectively and efficiently attach to the wireless network cores. Moreover, non-3GPP UEs are unable to access network core services that are restricted to 3GPP UEs.

TECHNICAL OVERVIEW

A data communication system serves a User Equipment (UE) over a Third Generation Partnership Project (3GPP) network core. In the data communication system, a 3GPP UE client exchanges authentication data with the 3GPP network core over a non-3GPP link. The 3GPP network core authenticates the 3GPP UE client, selects a network slice for the 3GPP UE client, and establishes an N1 link for the network slice over the non-3GPP link. The 3GPP UE client exchanging network signaling with the 3GPP network core for the network slice over the N1 link. The 3GPP UE client exchanges additional authentication data with the 3GPP network core over the non-3GPP link. The 3GPP network core selects another network slice for the 3GPP UE client and establishes another N1 link for the other network slice over the non-3GPP link. The 3GPP UE client exchanges additional network signaling with the 3GPP network core for the other network slice over the other N1 link.

DETAILED DESCRIPTION

Figure 1:
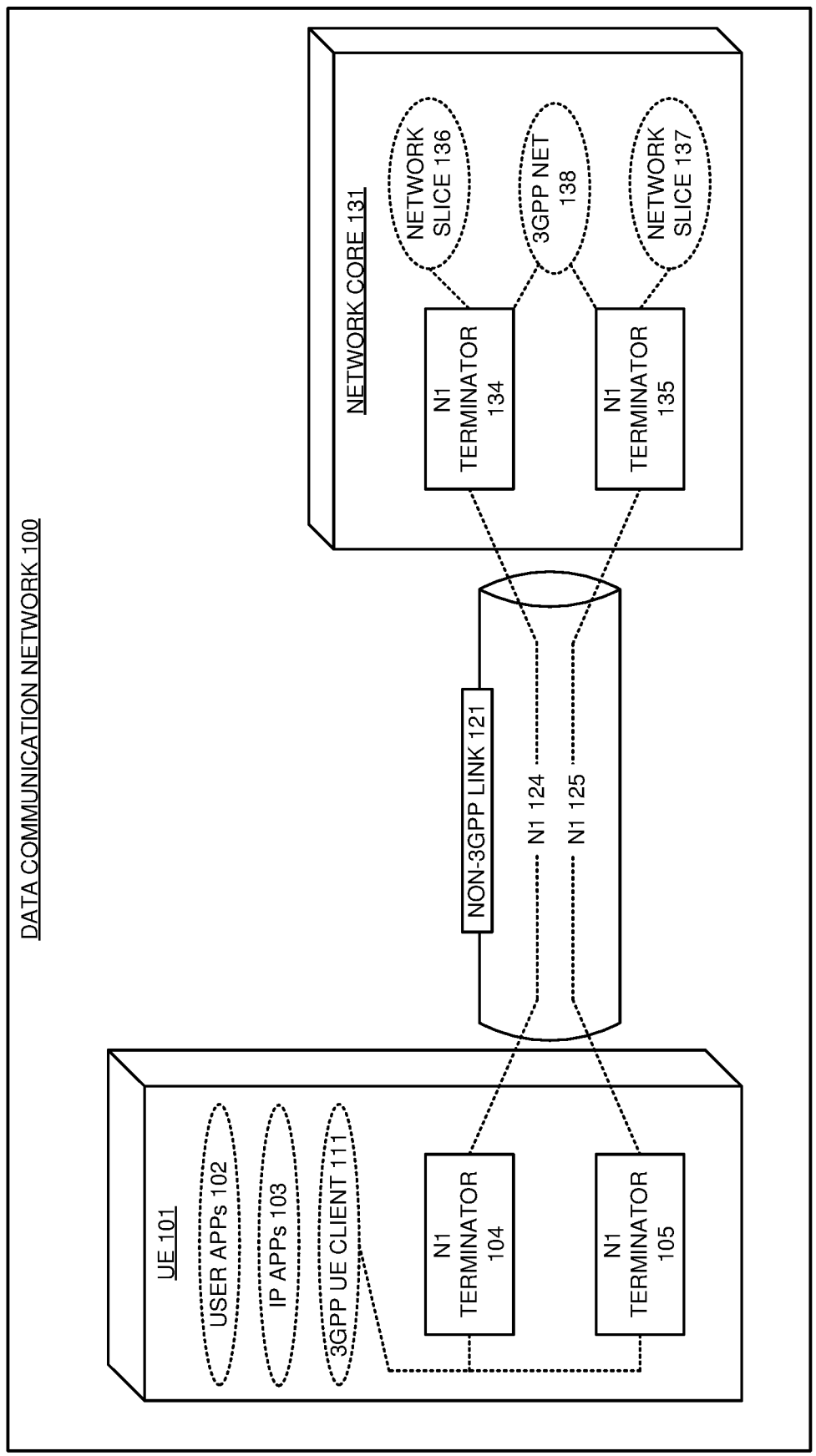
FIG. 1 illustrates a data communication network to serve a User Equipment (UE) over a Third Generation Partnership Project (3GPP) network core.

FIG. 1 illustrates data communication network 100 serve non-Third Generation Partnership Project (3GPP) User Equipment (UE) 101 over 3GPP network core 131. UE 101 comprises a computer, phone, vehicle, sensor, robot, or some other data appliance with wireless and/or wireline communication circuitry. Data communication network 100 delivers services to UE 101 like internet-access, machine communications, media-streaming, or some other data communications product. Data communication network 100 comprises UE 101, non-3GPP link 121, and network core 131. UE 101 comprises user applications (USER APPs) 102, Internet Protocol Applications (IP), 3GPP UE client 111, N1 terminator 104, and N1 terminator 105. Non-3GPP link 121 comprises a data communication link like an Institute of Electrical and Electronic Engineers (IEEE) 802.11 (WIFI) link that supports N1 124 and N1 125. Network core 131 comprises N1 terminator 134, N1 terminator 135, network slice 136, network slice 137, and 3GPP networking application (NET) 138. In this example, the number of slices network core 131 serves to UE 101 has been restricted for clarity. Network core 131 is depicted serving UE 401 with two slices (network slice 131 and network slice 132), however network core 131 may serve UE 101 with many more slices and other types of slices. For example, network core 131 might serve UE 101 with eight different slice types depending on the capabilities of UE 101.

Various examples of network operation and configuration are described herein. In some examples, 3GPP UE client 111 exchanges authentication data with 3GPP network core 131 over non-3GPP link 121. The authentication data may comprise Extensible Authentication Protocol (EAP) data, Fifth Generation Authentication and Key Agreement (5G AKA) data, and the like. 3GPP network core 131 exchanges the authentication data with 3GPP UE client 111, and in response, authenticates 3GPP UE client 111. 3GPP network core 131 selects network slice 136 for 3GPP UE client 111. 3GPP network core 131 establishes N1 link 124 for network slice 136 over non-3GPP link 121. 3GPP UE client 111 exchanges network signaling with 3GPP network core 131 for network slice 136 over N1 link 124. For example, 3GPP UE client 111 may exchange network signaling over N1 link 124 from slice 136 that is intended for user applications 102. 3GPP UE client 111 exchanges additional authentication data with 3GPP network core 131 over non-3GPP link 121. 3GPP network core 131 exchanges the additional authentication data with 3GPP UE client 111, and in response, selects network slice 137 for 3GPP UE client 111. 3GPP UE client 111 establishes N1 link 125 for network slice 137 over non-3GPP link 121. 3GPP UE client 111 exchanges additional network signaling with 3GPP network core 131 for network slice 137 over the N1 link 125. Advantageously, non-3GPP UE 101 and 3GPP network core 131 effectively establish multiple N1 signaling links over a single non-3GPP link. Moreover, non-3GPP UE 101 and 3GPP network core 131 establish N1 signaling links on a per slice basis.

UE 101 communicates with network core 131 over technologies like Low-Power Wide Area Network (LP-WAN), IEEE 802.11 (WIFI), IEEE 802.3 (ENET), Bluetooth, Narrowband Internet-of-Things (NB-IoT), and/or some other networking protocol. The wireless communication technologies use electromagnetic frequencies in the low-band, mid-band, high-band, or some other portion of the electromagnetic spectrum. The communication links that support these technologies use metallic links, glass fibers, radio channels, or some other communication media. The communication links use ENET, Time Division Multiplex (TDM), Data Over Cable System Interface Specification (DOCSIS), Internet Protocol (IP), General Packet Radio Service Transfer Protocol (GTP), 5GNR, LTE, WIFI, Fifth Generation Core (5GC), virtual switching, inter-processor communication, bus interfaces, and/or some other data communication protocols.

UE 101 comprises antennas, amplifiers, filters, modulation, analog/digital interfaces, microprocessors, software, memories, transceivers, bus circuitry, and the like. Network core 131 comprises microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of data communication network 100 as described herein.

Figure 2:
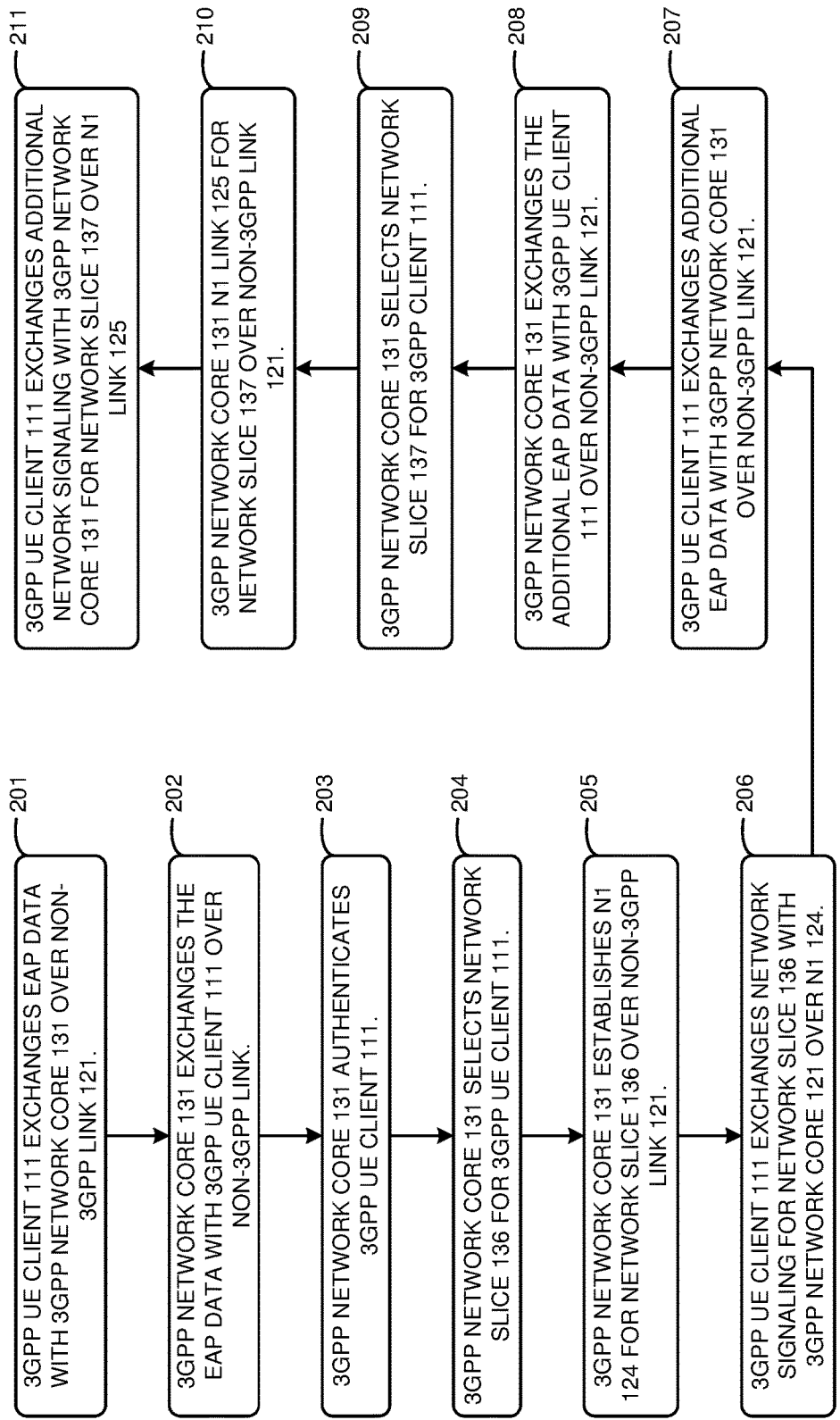
FIG. 2 illustrates an exemplary operation of the data communication network to serve the UE over the 3GPP network core.

FIG. 2 illustrates an exemplary operation of data communication network 100 to serve UE 101 over network core 131. The operation may differ in other examples. 3GPP UE client 111 exchanges authentication data with 3GPP network core 131 over non-3GPP link 121 (201). For example, 3GPP client 111 may exchange EAP data and/or 5G AKA data with 3GPP network core 131. 3GPP network core 131 exchanges the authentication data with 3GPP UE client 111 over non-3GPP link 121 (202). 3GPP network core 131 authenticates 3GPP UE client 111 (203). 3GPP network core 131 selects network slice 136 for 3GPP UE client 111 (204). 3GPP network core 131 establishes N1 link 124 for network slice 136 (205). 3GPP UE client 111 exchanges network signaling for network slice 136 with 3GPP network core 131 over N1 link 124 (206). 3GPP UE client 111 exchanges additional authentication data with 3GPP network core 131 over non-3GPP link 121 (207). 3GPP network core 131 exchanges the additional authentication data with 3GPP UE client 111 over non-3GPP link 121 (208). 3GPP network core 131 selects network slice 137 for 3GPP UE client 111 (209). 3GPP network core 131 establishes N1 125 for network slice 137 (210). 3GPP UE client 111 exchanges additional network signaling with 3GPP network core 131 for network slice 137 over N1 link 125 (211).

Figure 3:
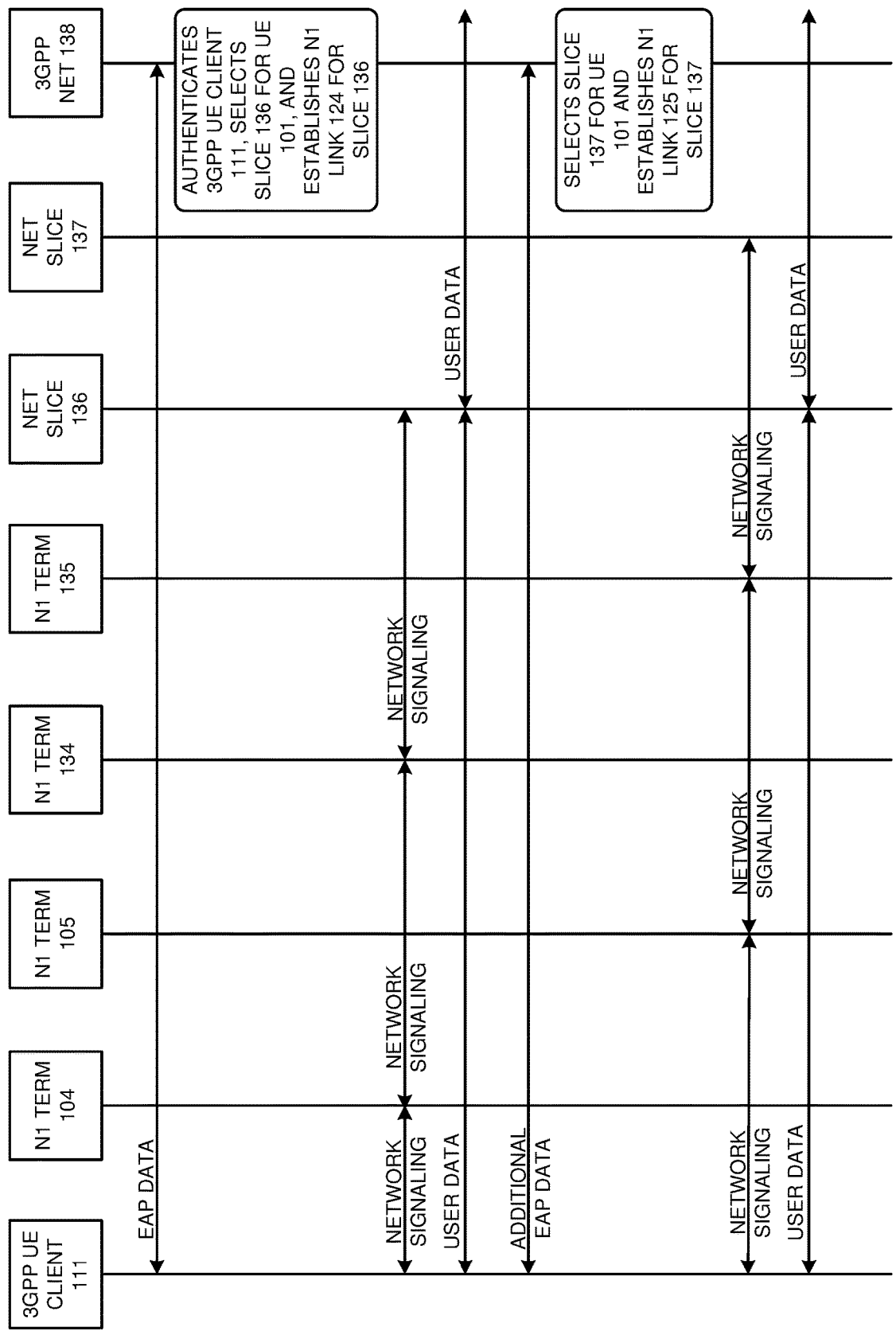
FIG. 3 illustrates an exemplary operation of the data communication network to serve the UE over the 3GPP network core.

FIG. 3 illustrates another exemplary operation of data communication network 100 to serve UE 101 over network core 131. The operation may differ in other examples. In UE 101, a user application of user applications 101 executes. In response, 3GPP UE client 111 transfers authentication data (like EAP data) to 3GPP networking application 138 in network core 131 over non-3GPP link 121. 3GPP networking application 138 authenticates 3GPP UE client 111 based on the authentication data. 3GPP networking application 138 selects network slice 136 for UE 101 and responsively establishes N1 link 124 for network slice 136 and UE 101. 3GPP UE client exchanges network signaling for network slice 136 with N1 terminator 104. N1 terminator 104 exchanges network signaling for network slice 136 with N1 terminator 134. N1 terminator 134 exchanges the network signaling with network slice 136. 3GPP UE client 111 exchanges user data for the user application with network slice 136. Network slice 136 exchanges the user data with external systems.

In UE 101, another user application of user applications 101 executes. In response, 3GPP UE client 111 transfers additional authentication data to 3GPP networking application 138. 3GPP networking application 138 selects network slice 137 for UE 101 and establishes N1 link 125 for slice 137 and UE 101. 3GPP UE client 111 exchanges networking signaling for slice 137 with N1 terminator 105. N1 terminator 105 exchanges the networking signaling with N1 terminator 135. N1 terminator 135 exchanges the network signaling with network slice 137. 3GPP UE client 111 exchanges user data for the user application with network slice 137. Network slice 137 exchanges the user data with external systems.

Figure 4:
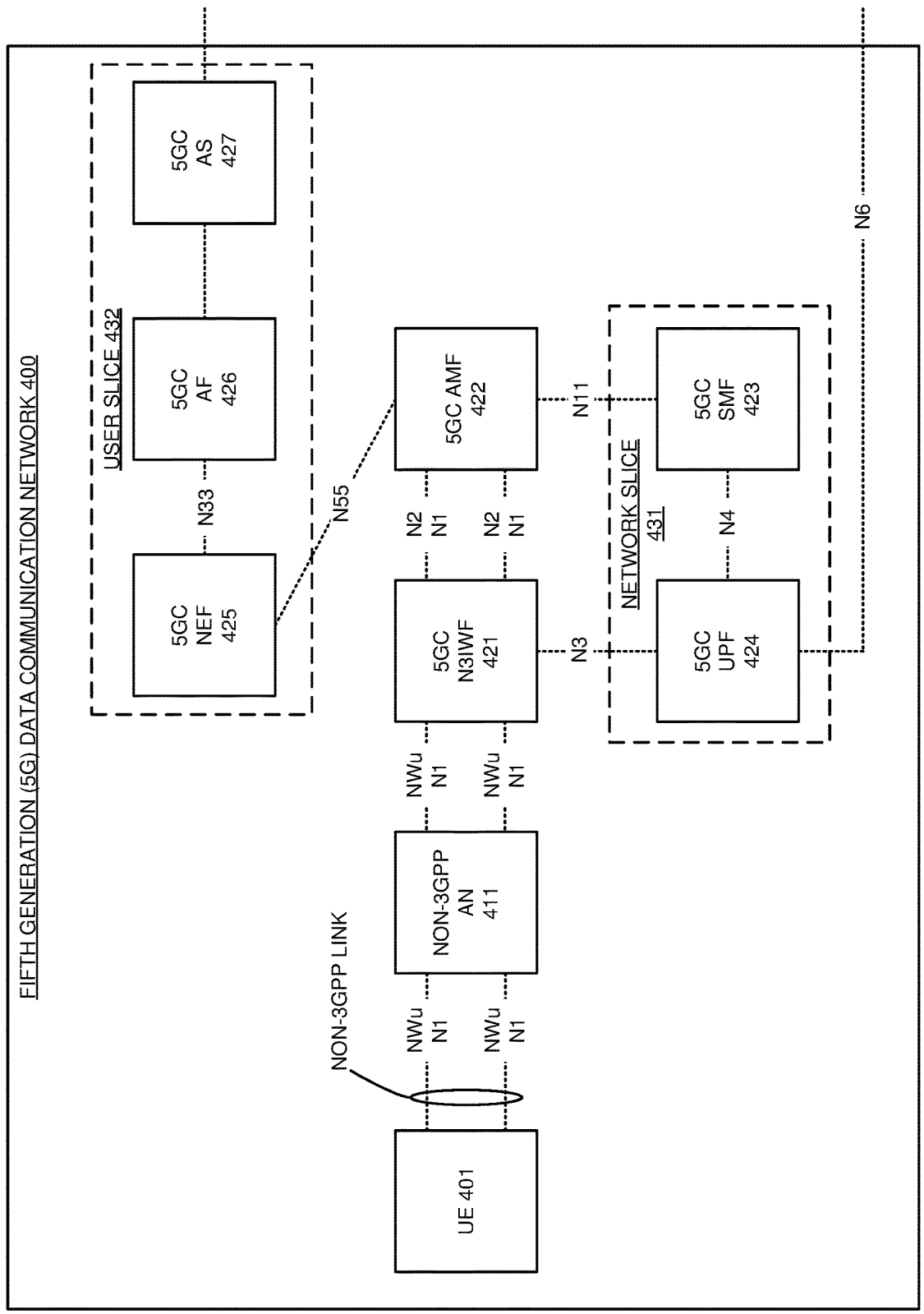
FIG. 4 illustrates a Fifth Generation (5G) data communication network to serve a UE over a 5G network core.

FIG. 4 illustrates Fifth Generation (5G) data communication network 400 to serve UE 401 using AMF 422. 5G data communication network 400 comprises an example of data communication network 100, although network 100 may vary from this example. 5G data communication network 400 comprises UE 401, Non-3GPP Access Node 411, Non-3GPP Interworking Function (N3IWF) 421, Fifth Generation Core (5GC) Access and Mobility Management Function (AMF) 422, network slice 431, and user slice 432. Network slice 431 comprises 5GC Session Management Function (SMF) 423, and 5GC User Plane Function 424. User slice 432 comprises 5GC Network Exposure Function (NEF) 425, 5GC Application Function (AF) 426, and 5GC Application Server (AS) 427. Other network elements like Policy Control Function (PCF), Uniform Data Repository (UDR), Network Repository Function (NRF), and the like are typically included but are omitted for clarity. In this example, the number of slices 5GC AMF serves to UE 401 has been restricted for clarity. 5GC AMF 422 is depicted serving UE 401 with two slices (network slice 131 and user slice 132), however 5GC AMF 422 may serve UE 401 with many more slices and other types of slices. For example, 5GC AMF 422 might serve UE 401 with eight different slice types depending on the capabilities of UE 401.

UE 401 attaches to non-3GPP access node 411 over a non-3GPP link. The non-3GPP link comprises an Institute of Electrical and Electronic Engineers (IEEE) 802.11 (WIFI) link, an IEEE 802.3 (ENET) link, and/or some other type of non-3GPP wireless or wireline communication link. UE 401 transfers Extensible Authentication Protocol (EAP) data to N3IWF 421 over the non-3GPP link and non-3GPP access node 411. In some examples, UE 401 transfers another type of authentication data to N3IWF 421 like 5G Authentication and Key Agreement (AKA). N3IWF 421 processes the EAP data and responsively authenticates and registers UE 401 over non-3GPP access node 411. UE 401 and N3IWF 421 establish an NWu over non-3GPP access node 411 and non-3GPP link. N3IWF 421 notifies AMF 422 of the authentication. UE 401 registers with 5GC AMF 422 over the NWu and N2 that traverse non-3GPP access node 411 and N3IWF 421. AMF 422 interacts with other network functions to authorize UE 401 for network services. For example, AMF 422 may query a Policy Control Function (PCF) to retrieve subscription information for UE 401 to authorize UE 401. In response to the authentication and authorization, AMF 422 retrieves UE context for UE 401 from a Unified Data Management (UDM). UE 401 and 5GC AMF 422 establish a first N1 link over the NWu and N2 that traverse non-3GPP access node 411 and N3IWF 421. In some examples, N3IWF 421 forgoes authenticating UE 401 and instead transfers the EAP data to AMF 422. In this case, AMF 422 interacts with an Authentication Server Function (AUSF) to authenticate UE 401 based on the received EAP data. The AUSF (not shown) uses EAP data to authenticate UE. The AUSF indicates the authentication of UE 401 to AMF 422.

UE 401 transfers a service request that indicates a slice type to AMF 422 over the first N1 link that traverses the NWu and N2 that traverse non-3GPP access node 411 and N3IWF 421. The slice type indicates a set of network functions that supports a service type. For example, a high-throughput user application may execute in UE 401 and UE 401 may transfer a service request that indicates a high-throughput slice type. AMF 422 receives and processes the service request and responsively identifies network slice 431 based on the slice type in the service request. AMF 422 determines UE 401 is authorized for network slice 431. In response, AMF 422 selects network slice 431 for UE 401. In some examples, AMF 422 interacts with a Network Slice Selection Function (NSSF) to select slices for UE 401 based on the requested slice type. AMF 422 selects a Quality-of-Service (QoS) level for UE 401 based on the slice type of network slice 431. AMF 422 associates network slice 431 with the first N1 link. AMF 422 indicates network slice 431 and the selected QoS level to UE 401 over the first N1 link that traverses the NWu and N2 that traverse non-3GPP access node 411 and N3IWF 421. UE 401 receives the indication and responsively associates network slice 431 with the first N1 link.

5GC AMF 422 signals N3IWF 421 over the N2 to serve UE 401 over the N3 between N3IWF 421 and 5GC UPF 424. 5GC AMF 422 signals 5GC SMF 423 in network slice 431 to serve UE 401 over the N3 between N3IWF 421 and 5GC UPF 424. 5GC SMF 423 controls 5GC UPF 424 over the N4 to serve UE 401 over the N6 and over the N3 between N3IWF 421 and 5GC UPF 424. 5GC AMF 422 transfers session context for network slice 431 to UE 401 over the first N1 which traverses the N2 and NWu that traverse N3IWF 421 and non-3GPP access node 411. UE 401 receives the session context over the first N1 and responsively associates the session context with network slice 431. UE 401 exchanges user data with non-3GPP access node 411 over the NWu that traverses the non-3GPP link. 5GC N3IWF 421 and 5GC UPF 424 exchange the user data over the N3. 5GC UPF 424 exchanges the user data with external data networks over the N6.

UE 401 transfers additional EAP data to N3IWF 421 over the non-3GPP link that traverses non-3GPP access node 411 to receive an additional network slice. For example, another application may execute in UE 401 and UE 401 may identify another slice type for the other application. N3IWF 421 processes the additional EAP data. N3IWF 421 determines UE 401 was previously authenticated and responsively notifies AMF 422. UE 401 and 5GC AMF 422 establish a second N1 link over the NWu and N2 that traverse non-3GPP access node 411 and N3IWF 421.

UE 401 transfers an additional service request that indicates another slice type to AMF 422 over the second N1 link that traverses the NWu and N2 that traverse non-3GPP access node 411 and N3IWF 421. AMF 422 receives and processes the service request and responsively identifies user slice 432 based on the slice type in the service request. AMF 422 determines UE 401 is authorized for user slice 432 based on the UE context for UE 401. In response, AMF 422 selects user slice 432 for UE 401 based on the slice type in the service request. AMF 422 selects a QoS level for UE 401 based on the slice type for user slice 432. AMF 422 associates user slice 432 with the second N1 link. AMF 422 indicates user slice 432 and the selected QoS level to UE 401 over the second N1 link that traverses the NWu and N2 that traverse non-3GPP access node 411 and N3IWF 421. UE 401 receives the indication and responsively associates user slice 432 with the second N1 link.

5GC AMF 422 signals 5GC AF 426 in user slice 432 over the N55 and N33 that traverse 5GC NEF 425 to serve UE 401. 5GC AF 426 interacts with 5GC AS 427 to serve UE 401. 5GC AS 427 generates user messages for UE 401 and transfers the user messages to 5GC AF 426. 5GC AF 426 transfers the user messages to 5GC AMF 422 over the N33 and N55 that traverse 5GC NEF 425. 5GC AMF 422 receives the user messages and associates the user messages with user slice 432. 5GC AMF 422 transfers the user messages from user slice 432 to UE 401 over the second N1 which traverses the N2 and NWu that traverse N3IWF 421 and non-3GPP access node 411. UE 401 receives the user messages over the second N1 which traverses the N2 and NWu that traverse N3IWF 421 and non-3GPP access node 411. UE 401 associates the user messages with user slice 432 based on the N1 link that the messages were received from.

In some examples, non-3GPP access node 411 comprises a trusted non-3GPP access node 411. In such a configuration, UE 401 establishes N1 links with AMF 422 that traverse non-3GPP access node 411 and a Trusted Network Gateway Function (TNGF) instead of N3IWF 421. The TNFG behaves in a similar manner as N3IWF 421 as described herein. Although UE 401 is depicted attaching to network elements of 5G data communication network 400, in some examples, UE may attach to a 4G data communication network. In this example, UE 401 attaches to the 4G data communication network over a 3GPP Evolved Packet Data Gateway (ePDG). The ePDG operates in a similar manner aa N3IWF 421 as described herein.

In some examples, AMF 422 may not be able to support the slice requested by UE 401. In this case, AMF 422 interacts with a Network Slice Selection Function (NSSF) to identify another AMF that can support the requested slice. The NSSF (not shown) queries a Network Repository Function (NRF) to locate another AMF that can support the network slice. The NRF (not shown) indicates the other AMF that can support the network slice to the NSSF. The NSSF responsively directs the other AMF to serve the requested slices to UE 401.

Figure 5:
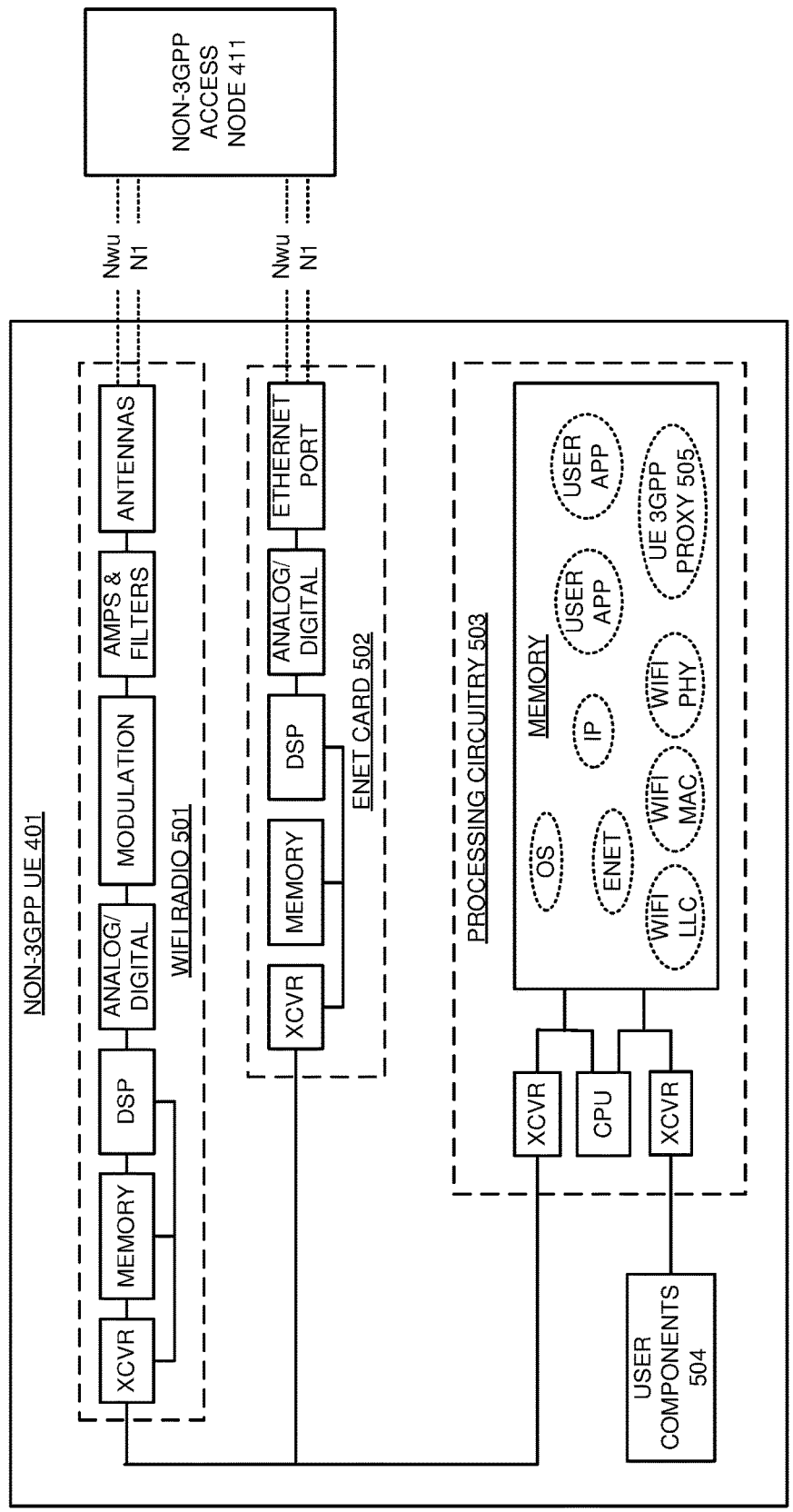
FIG. 5 illustrates the UE in the 5G data communication network.

FIG. 5 illustrates UE 401 in 5G data communication network 400. UE 401 comprises an example of UE 101, although UE 101 may differ from this example. UE 401 comprises WIFI radio 501, ENET card 502, and processing circuitry 503. WIFI radio 501 comprises antennas, amplifiers, filters, modulation, analog-to-digital interfaces, DSP, memory, and transceivers that are coupled over bus circuitry. ENET card 502 comprises an ENET port, analog-to-digital interfaces, Digital Signal Processors (DSP), memory, and transceivers that are coupled over bus circuitry. Processing circuitry 503 comprises memory, CPU, user interfaces and components, and transceivers (XCVRs) that are coupled over bus circuitry. The memory in processing circuitry 503 stores an operating system (OS), user applications (USER APP), and network applications like Internet Protocol (IP), ENET, WIFI Physical Layer (PHY), WIFI Media Access Control (MAC), WIFI Logical Link Control (LLC), and UE 3GPP proxy 505. In some examples, some portions of UE 401 may be omitted, and UE 401 may be WIFI only or ENET only. For example, if UE 401 is WIFI only, ENET card 502 and the ENET network application would not be present. For example, if UE 401 is ENET only, WIFI radio 501 and the WIFI PHY, WIFI MAC, and WIFI LLC network applications would not be present.

The antennas in WIFI radio 501 are wirelessly coupled to non-3GPP access node 411 over a non-3GPP wireless link that supports the NWu. The ENET port in ENET card 502 is wireline coupled to non-3GPP access node 411 over a non-3GPP metal and/or glass link that supports the NWu. Transceivers in WIFI radio 501 and ENET card 502 are coupled to transceivers in processing circuitry 503. Transceivers in processing circuitry 503 are coupled to user components 504 like displays, controllers, and memory. The CPU in processing circuitry 503 executes the operating system, user applications, and WIFI/ENET network applications to exchange WIFI data and ENET data with non-3GPP access node 411 over WIFI radio 501 and/or ENET card 502. UE 401 could also use other non-3GPP protocols like bluetooth and narrowband internet-of-things.

In some examples, the WIFI network applications in UE 401 attach to non-3GPP access node 411 over WIFI radio 501. UE 3GPP proxy 505 transfers EAP data to N3IWF 421 over the non-3GPP link and non-3GPP access node 411. UE 3GPP proxy 505 and N3IWF 421 establish an NWu over non-3GPP access node 411. In a like manner, the ENET network applications in UE 401 may attach to non-3GPP access node 411 over ENET card 502. The ENET applications may register with N3IWF 421 over the non-3GPP access node 411. N3IWF 421 authenticates UE 3GPP proxy 505. UE 3GPP proxy 505 and N3IWF 421 establish an NWu over non-3GPP access node 411 and the non-3GPP link. N3IWF 421 notifies AMF 422 of the authentication. 3GPP UE proxy 505 registers with 5GC AMF 422 over the NWu and N2 that traverse non-3GPP access node 411 and N3IWF 421. AMF 422 authorizes UE 401 for network services. 3GPP UE proxy 505 and 5GC AMF 422 establish a first N1 link over the NWu and N2 that traverse non-3GPP access node 411 and N3IWF 421.

3GPP UE proxy 505 indicates a slice type to AMF 422 over the first N1 link that traverses the NWu and N2 that traverse non-3GPP access node 411 and N3IWF 421. Depending on the connection type, 3GPP UE proxy 505 utilizes the WIFI applications or ENET application to indicate the slice type. For example, if UE 401 is attached to non-3GPP access node 411 over ENET card 502, then 3GPP UE proxy uses ENET application to indicate the slice type. 3GPP UE proxy 505 receives a response from AMF 422 that indicates network slice 431 over the first N1 link that traverses the NWu and N2 that traverse non-3GPP access node 411 and N3IWF 421. 3GPP UE proxy 505 receives the indication and responsively associates network slice 431 with the first N1 link. 3GPP UE proxy 505 receives session context for network slice 431 over the first N1 that traverses the N2 and NWu that traverse N3IWF 421 and non-3GPP access node 411. The WIFI applications and/or ENET application exchange user data with non-3GPP access node 411 over the NWu that traverses the non-3GPP link. Non-3GPP access node 411 exchanges the user data with 5GC N3IWF 421 over the NWu.

3GPP UE proxy 505 transfers additional EAP data to N3IWF 421 over the non-3GPP link that traverses non-3GPP access node 411 for an additional network slice. N3IWF 421 notifies AMF 422. 3GPP UE proxy 505 and 5GC AMF 422 establish a second N1 link over the NWu and N2 that traverses non-3GPP access node 411 and N3IWF 421. 3GPP UE proxy 505 indicates another slice type to AMF 422 over the second N1 link that traverses the NWu and N2 that traverse non-3GPP access node 411 and N3IWF 421. 3GPP UE proxy 505 receives a response from AMF 422 that indicates user slice 432 over the second N1 link that traverses the NWu and N2 that traverse non-3GPP access node 411 and N3IWF 421. 3GPP UE proxy 505 associates user slice 432 with the second N1 link. 3GPP UE proxy 505 receives user messages over the second N1 which traverses the N2 and NWu that traverse N3IWF 421 and non-3GPP access node 411. UE 401 determines the user messages are from user slice 432 based on the N1 link that the messages were received from.

Figure 6:
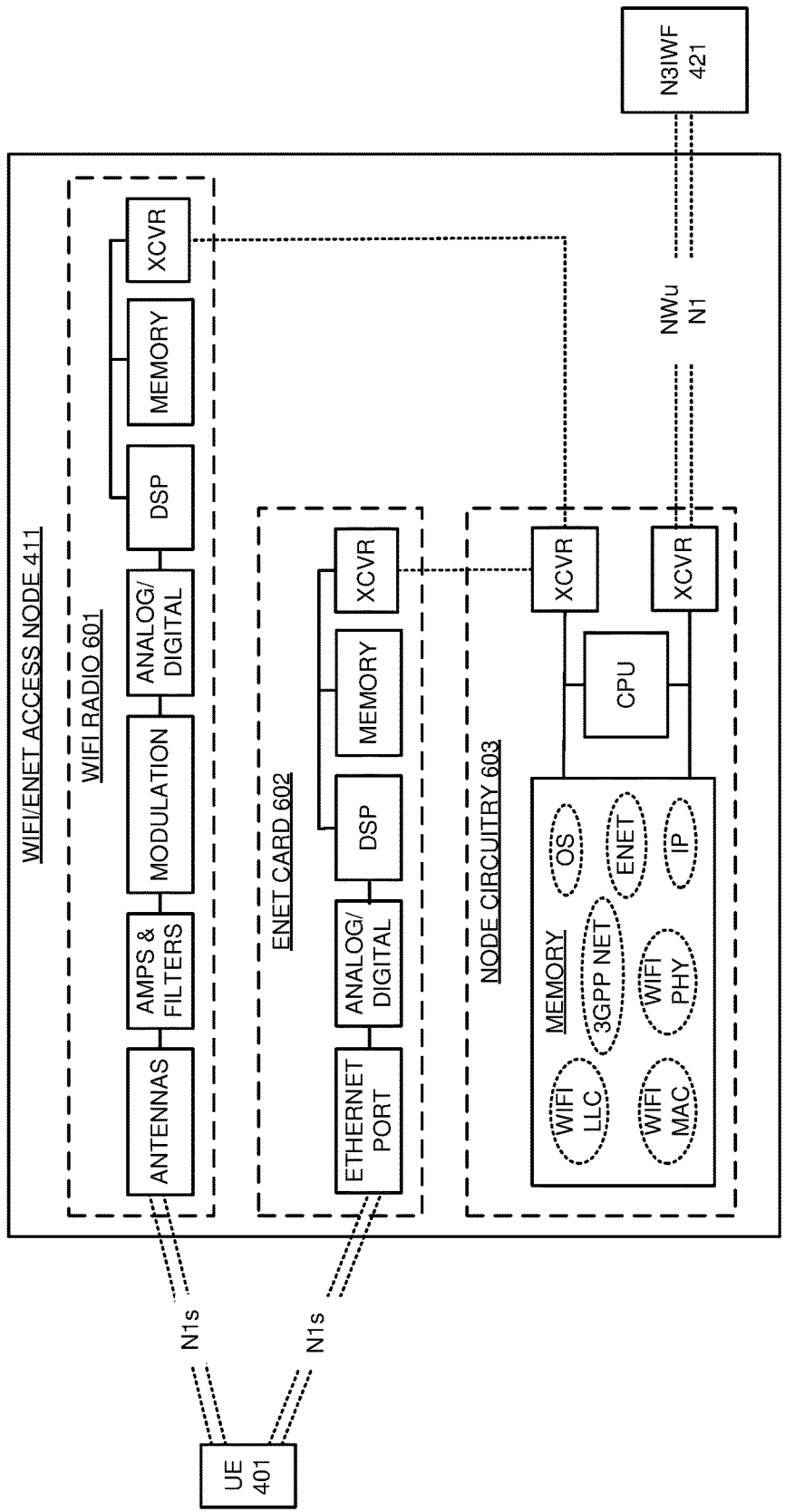
FIG. 6 illustrates a non-3GPP access node in the 5G data communication network.

FIG. 6 illustrates non-3GPP access node 411 in 5G communication network 400. Non-3GPP access node 411 comprises an example of access node 111, although access node 111 may differ from this example. Non-3GPP access node 411 comprises WIFI radio 601, ENET card 602, and node circuitry 603. Non-2GPP access node 411 may comprise a trusted access node or an untrusted access node. WIFI radio 601 comprises antennas, amplifiers, filters, modulation, analog-to-digital interfaces, DSP, memory, and transceivers that are coupled over bus circuitry. ENET card 602 comprises ENET ports, analog-to-digital interfaces, DSP, memory, and transceivers that are coupled over bus circuitry. Node circuitry 603 comprises memory, CPU, and transceivers that are coupled over bus circuitry. The memory in node circuitry 603 stores operating systems and network applications like WIFI PHY, WIFI MAC, WIFI LLC, ENET, IP, and 3GPP Networking (NET). In some examples, WIFI radio 601 and the WIFI network applications are omitted, and ENET card 602 and the ENET applications are used as described. In other examples, ENET card 602 and the ENET applications are omitted, and WIFI radio 601 and the WIFI network applications are used as described. Other wireless protocols like bluetooth and narrowband internet-of-things could be used.

The antennas in WIFI radio 601 are wirelessly coupled to UE 401 over non-3GPP wireless links that support NWu. The ENET port in ENET card 602 is wireline coupled to UE 401 over non-3GPP metal and/or glass links that support NWu. Transceivers in WIFI radio 601 and ENET card 602 are coupled to transceivers in node circuitry 603. Transceivers in node circuitry 603 are coupled to transceivers in N3IWF 421 over backhaul links. The CPU in node circuitry 603 executes the operating system and network applications to exchange data and signaling with UE 401 over the NWu and to exchange data and signaling with N3IWF 421 over the NWu.

In some examples, UE 401 attaches to the WIFI network applications in node circuitry 603 over WIFI radio 601. 3GPP UE proxy 505 registers with N3IWF 421 over WIFI radio 601 and node circuitry 603. UE 401 and N3IWF 421 establish an NWu that traverses the non-3GPP wireless link. UE 401 registers with 5GC AMF 422 over the over NWu and N2 that traverse WIFI radio 601, node circuitry 603, and N3IWF 421. 3GPP UE proxy 505 and 5GC AMF 422 establish the first N1 for network slice 431 and the second N1 for user slice 432 which traverse the NWu and N2 that traverse WIFI radio 601, node circuitry 603, and N3IWF 421. UE 401 and the 3GPP networking application in node circuitry 603 exchange user data over the NWu that traverses WIFI radio 601 and the WIFI applications. The 3GPP networking application in node circuitry 603 and N3IWF 421 exchange the user data over the NWu.

In some examples, UE 401 attaches to the ENET applications in node circuitry 603 over ENET card 602. UE 401 registers with N3IWF 421 over ENET card 602 and node circuitry 603. UE 401 and N3IWF 421 establish an NWu that traverses the non-3GPP wireline link. 3GPP UE proxy 505 registers with 5GC AMF 422 over the over the NWu and N2 that traverse ENET card 602, node circuitry 603, and N3IWF 421. 3GPP UE proxy 505 and 5GC AMF 422 establish the first N1 for network slice 431 and the second N1 for user slice 432 that traverse the NWu and N2 that traverse ENET card 602, node circuitry 603, and N3IWF 421. UE 401 and the 3GPP networking application in node circuitry 603 exchange user data over the NWu that traverses ENET card 602 and ENET applications. The 3GPP networking application in node circuitry 603 and N3IWF 421 exchange the user data over the NWu.

In other examples, when non-3GPP access node 411 is trusted, UE 401 instead establishes an NWt link with a TNGW that traverses the non-3GPP link. UE 401 establishes N1 links with AMF 422 over the NWt link in an operation similar to the establishment of N1 links over the NWu link.

Figure 7:
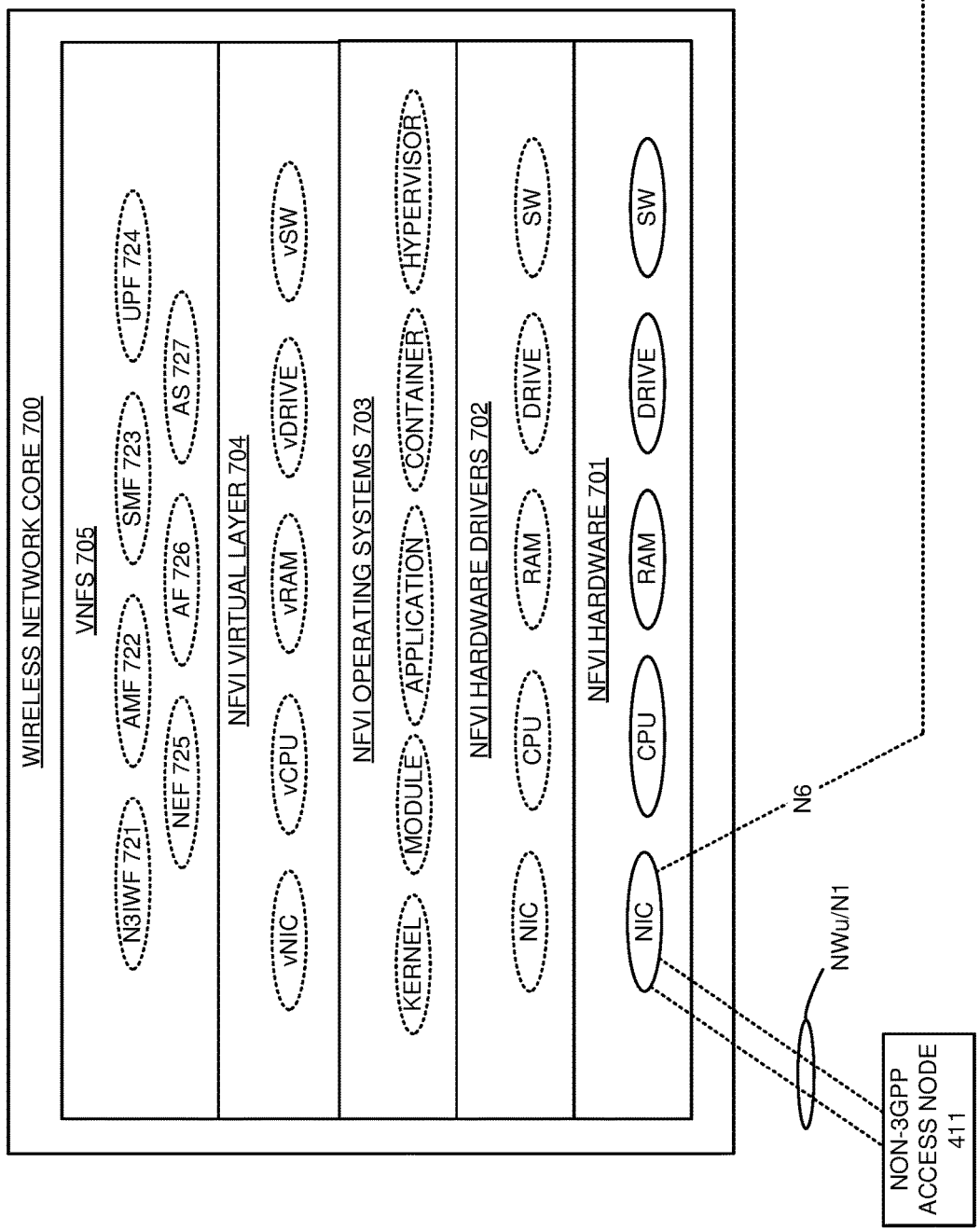
FIG. 7 illustrates a Network Function Virtualization Infrastructure (NFVI) comprising in the 5G data communication network.

FIG. 7 illustrates Network Function Virtualization Infrastructure (NFVI) 700 in 5G data communication network 400. NFVI 700 comprises an example of network core 131, however network core 131 may differ. NFVI 700 comprises NFVI hardware 701, NFVI hardware drivers 702, NFVI operating systems 703, NFVI virtual layer 704, and NFVI Virtual Network Functions (VNFs) 705. NFVI hardware 701 comprises Network Interface Cards (NICs), CPU, RAM, Flash/Disk Drives (DRIVE), and Data Switches (SW). NFVI hardware drivers 702 comprise software that is resident in the NIC, CPU, RAM, DRIVE, and SW. NFVI operating systems 703 comprise kernels, modules, applications, containers, hypervisors, and the like. NFVI virtual layer 704 comprises vNIC, vCPU, vRAM, vDRIVE, and vSW. NFVI VNFs 705 comprise N3IWF 721, AMF 722, SMF 723, UPF 724, NEF 725, AF 726, and AS 727. Other VNFs like Policy Control Functions (PCF), Authentication Server Function (AUSF), and Network Repository Function (NRF) are typically present but are omitted for clarity. NFVI 700 may be located at a single site or be distributed across multiple geographic locations. The NIC in NFVI hardware 701 is coupled to non-3GPP access node 411 over data links that support NWu, N1, N2, N3, and N6 links. NFVI hardware 701 executes NFVI hardware drivers 702, NFVI operating systems 703, NFVI virtual layer 704, and NFVI VNFs 705 to form N3IWF 421, AMF 422, SMF 423, UPF 424, NEF 425, AF 426, and AS 427.

Figure 8:
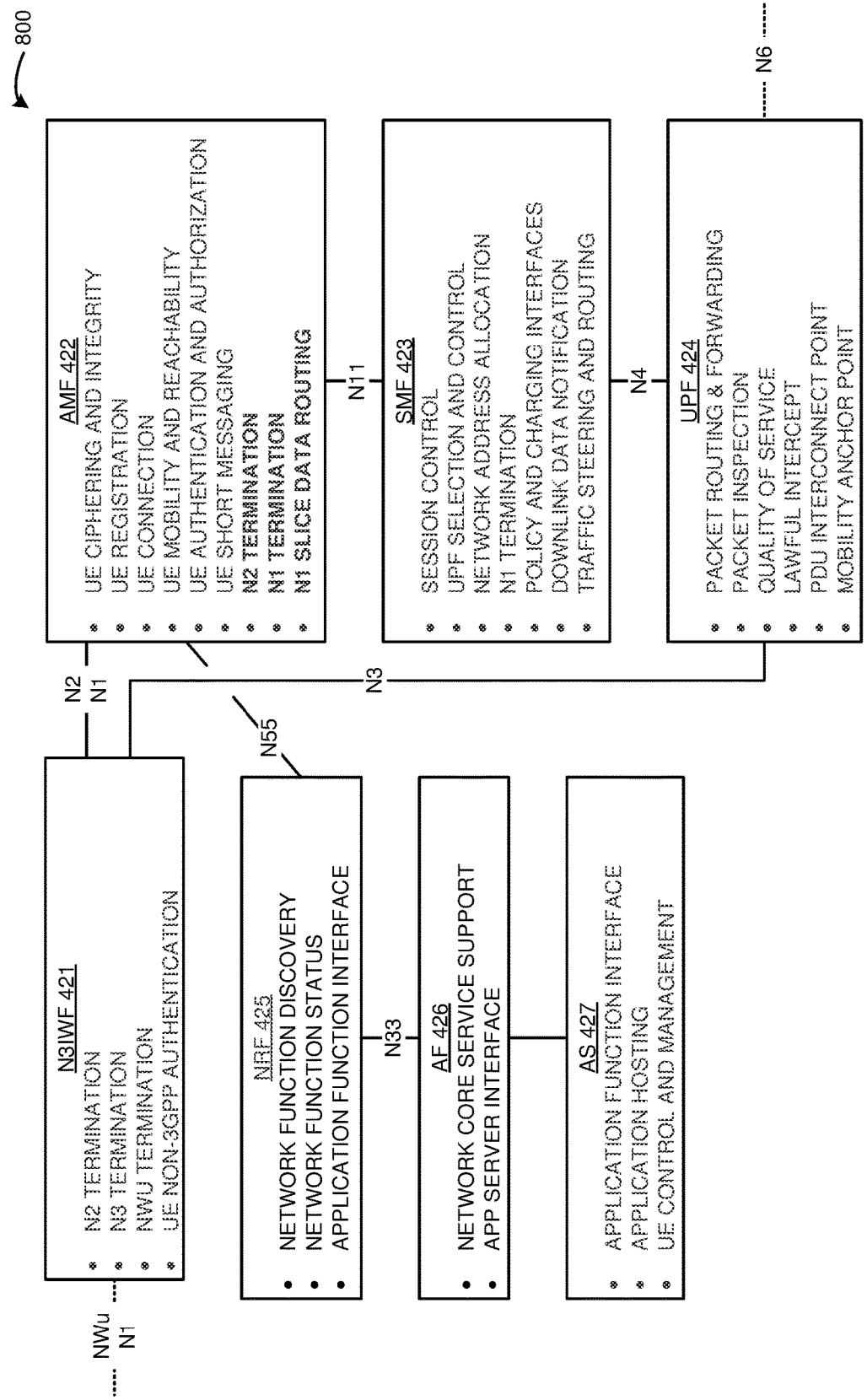
FIG. 8 further illustrates the NFVI in the 5G data communication network.

FIG. 8 further illustrates NFVI 700 in 5G data communication network 400. 5GC N3IWF 421 performs N2 termination, N3 termination, NWu termination, and UE non-3GPP authentication. 5GC AMF 422 performs UE ciphering and integrity, UE registration, UE connection management, UE mobility and reachability, UE authentication and authorization, UE short messaging, N2 Termination, N1 Termination and N1 slice data routing, 5GC SMF 423 performs session control, UPF selection and control, network address allocation, N1 termination, policy and charging interfaces, downlink data notification, and traffic steering and routing, 5GC UPF 424 performs packet routing and forwarding, packet inspection, QoS handling, PDU interconnection, and mobility anchoring. NRF 425 performs network function discovery, network function status, and application function interfacing. AF 426 performs network core service support and application server interfacing. AS 427 performs application function interfacing, application hosting, and UE control and management.

In some examples, N3IWF 421 receives EAP data from UE 401 over the non-3GPP link and non-3GPP access node 411. N3IWF 421 authenticates UE 401 based on the EAP data and registers UE 401 over non-3GPP access node 411. N3IWF 421 and UE 401 establish an NWu over non-3GPP access node 411 and the non-3GPP link. N3IWF 421 notifies AMF 422 of the authentication. 5GC AMF 422 registers UE 401 over the NWu and N2 that traverse non-3GPP access node 411 and N3IWF 421. AMF 422 authorizes UE 401 for network services and retrieves UE context for UE 401. 5GC AMF 422 establishes a first N1 link over the NWu and N2 that traverse non-3GPP access node 411 and N3IWF 421 with UE 401. In some examples, N3IWF 421 forgoes authenticating UE 401 and instead transfers the EAP data to AMF 422. In this case, AMF 422 interacts with an AUSF to authenticate UE 401 based on the received EAP data. The AUSF (not shown) uses EAP data to authenticate UE. The AUSF indicates the authentication of UE 401 to AMF 422.

AMF 422 receives a slice type request from UE 401 over the first N1 link that traverses the NWu and N2 that traverse non-3GPP access node 411 and N3IWF 421. AMF 422 identifies network slice 431 based on the slice type. AMF 422 determines UE 401 is authorized for network slice 431. AMF 422 selects network slice 431 for UE 401. AMF 422 associates network slice 431 with the first N1 link. AMF 422 selects a QoS level for UE 401 based on the slice type. AMF 422 indicates network slice 431 to UE 401 over the first N1 link that traverses the NWu and N2 that traverse non-3GPP access node 411 and N3IWF 421.

5GC AMF 422 directs N3IWF 421 to serve UE 401 over the N3 between N3IWF 421 and 5GC UPF 424. 5GC AMF 422 directs 5GC SMF 423 in network slice 431 to establish a PDU session for UE 401 over the N3 between N3IWF 421 and 5GC UPF 424. 5GC SMF 423 manages 5GC UPF 424 over the N4 to serve UE 401 over the N6 and over the N3 between N3IWF 421 and 5GC UPF 424. 5GC SMF 423 transfers session context to 5GC AMF 422 that indicates 5GC UPF 424. AMF 422 associates the session context with network slice 431 and responsively transfers session context for network slice 431 to UE 401 over the first N1 which traverses the N2 and NWu that traverse N3IWF 421 and non-3GPP access node 411. 5GC N3IWF 421 exchanges user data with UE 401 over the NWu that traverses non-3GPP access node 411. N3IWF and 5GC UPF 424 exchange the user data over the N3. 5GC UPF 424 exchanges the user data with external data networks over the N6.

N3IWF receives additional EAP data from UE 401 over the non-3GPP link that traverses non-3GPP access node 411 for an additional network slice. N3IWF 421 processes the additional EAP data and determines UE 401 was previously authenticated. N3IWF notifies AMF 422. AMF 422 receives the notification and identifies the UE context for UE 401. 5GC AMF 422 establishes a second N1 link over the NWu and N2 that traverse non-3GPP access node 411 and N3IWF 421 with UE 401.

AMF 422 receives an additional slice type request from UE 401 over the second N1 link that traverses the NWu and N2 that traverse non-3GPP access node 411 and N3IWF 421. AMF 422 processes the slice type request and responsively identifies user slice 432. AMF 422 determines UE 401 is authorized for user slice 432 based on the UE context. AMF 422 selects user slice 432 for UE 401 and associates user slice 432 with the second N1 link. AMF 422 selects a QoS level for user slice 432 for UE 401 based on the slice type. AMF 422 indicates user slice 432 to UE 401 over the second N1 link that traverses the NWu and N2 that traverse non-3GPP access node 411 and N3IWF 421.

5GC AMF 422 signals 5GC AF 426 in user slice 432 over the N55 and N33 that traverse 5GC NEF 425 to serve UE 401. 5GC AF 426 interacts with 5GC AS 427 to serve UE 401. 5GC AS 427 generates control signaling for UE 401 and transfers the control signaling to 5GC AF 426. 5GC AF 426 transfers the control signaling to 5GC AMF 422 over the N33 and N55 that traverse 5GC NEF 425. 5GC AMF 422 determines the control signaling is from user slice 432 and responsively associates the control signaling with the second N1. 5GC AMF 422 transfers the control signaling to UE 401 over the second N1 which traverses the N2 and NWu that traverse N3IWF 421 and non-3GPP access node 411.

Figure 9:
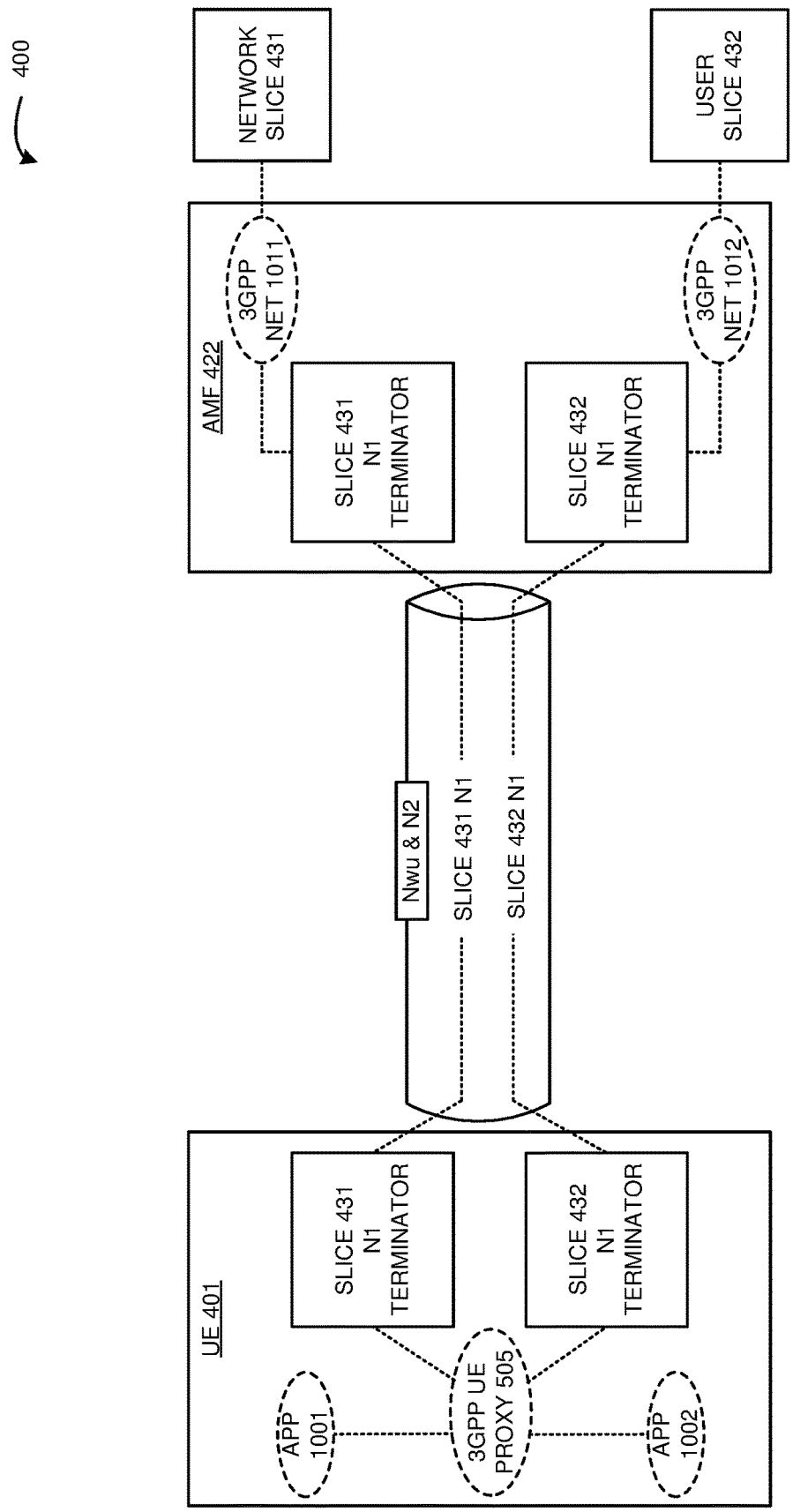
FIG. 9 illustrates an exemplary operation of the 5G data communication network to serve the UE over an Access and Mobility Management Function in the 5G network core.

FIG. 9 illustrates an exemplary operation UE 401 and AMF 422 in the 5G data communication network 400. In other examples, the operation may differ. In this example, UE 401 and AMF 422 establish a first N1 link for network slice 431 and a second N1 link for user slice 432. The first and second N1 links traverse the NWu and N2 links. The first N1 is between N1 terminators of UE 401 and AMF 422 that are for network slice 431. The second N1 is between N1 terminators of UE 401 and AMF 422 that are for user slice 432.

3GPP UE proxy 505 attaches to AMF 422 over non-3GPP access node 411 and N3IWF 412. 3GPP UE proxy 505 transfers EAP data to N3IWF 421. N3IWF 421 authenticates UE 401 based on the EAP data. N3IWF 421 establishes an NWu for UE 401 over non-3GPP access node 411. N3IWF 421 notifies AMF 422 of the authentication over the N2. 3GPP UE proxy 505 registers with 5GC AMF 422 over the NWu and N2 that traverse non-3GPP access node 411 and N3IWF 421. AMF 422 interacts with other network functions to authorize UE 401 and in response to the authentication and authorization, AMF 422 retrieves UE context for UE 401 from a UDM (not shown). UE 401 and 5GC AMF 422 establish a first N1 link over the NWu and N2 that traverse non-3GPP access node 411 and N3IWF 421.

User application 1001 executes in UE 401. In response, 3GPP UE proxy 505 transfers a slice request that indicates a slice type for user application 1001 to AMF 422 over the first N1 link that traverses the NWu and N2. AMF 422 processes the slice request and responsively selects network slice 431 for 3GPP UE 505 based on the requested slice type. AMF 422 associates network slice 431 with the first N1 link. AMF 422 selects a Quality-of-Service (QoS) level for network slice 431 for UE 401 based on the slice type. 3GPP network application 1011 in AMF 422 routes data and signaling for network slice 431 and UE 401. AMF 422 indicates network slice 431 to 3GPP UE proxy 505 over the first N1 link that traverses the NWu and N2 that traverse non-3GPP access node 411 and N3IWF 421. 3GPP UE proxy 505 receives the indication and responsively associates network slice 431 with the first N1 link.

3GPP networking application 1011 signals 5GC SMF 423 in network slice 431 to serve UE 401 over the N3 between N3IWF 421 and 5GC UPF 424. 5GC SMF 423 transfers session context to 3GPP networking application 1011 that indicates UPF 424 in network slice 431. 3GPP networking application 1011 receives the session context and determines the context is for slice 431. 3GPP networking application 1011 transfers session context over the N1 for slice 431 which traverses the N2 and NWu to 3GPP UE proxy 505. 3GPP UE proxy 505 receives the session context over the N1 link for slice 431 and responsively associates the session context with network slice 431. 3GPP UE proxy 505 uses the session context for network slice 431 to establish a session for user application 1001. UE 401 exchanges data for user application 1001 with network slice 431. Network slice 431 exchanges the user data with external data networks.

User application 1002 executes in UE 401. In response, 3GPP UE proxy 505 transfers additional EAP data to N3IWF 421 to receive an additional network slice. N3IWF 421 processes the additional EAP data and determines UE 401 was previously authenticated. N3IWF 421 notifies AMF 422. 3GPP UE proxy 505 and 5GC AMF 422 establish a second N1 link over the NWu and N2 between their N1 terminators. 3GPP UE proxy 505 transfers another slice request for user application 1002 that indicates another slice type AMF 422 over the second N1 link that traverses the NWu and N2 to AMF 422. AMF 422 processes the slice request and responsively selects user slice 432 for UE 401 based on the slice type. AMF 422 associates user slice 432 with the second N1 link. AMF 422 selects a QoS level for user slice 432 for UE 401. 3GPP network application 1012 in AMF 422 routes data and signaling for network slice 431 and UE 401. 3GPP network application 1012 indicates user slice 432 to 3GPP UE proxy 505 over the second N1 link that traverses the NWu and N2. 3GPP UE proxy 505 receives the indication and responsively associates user slice 432 with the second N1 link.

3GPP network application 1012 in AMF 422 signals AF 426 in user slice 432 to serve UE 401. 5GC AF 426 interacts with 5GC AS 427 to serve UE 401. 5GC AF 426 transfers user messages for UE 401 to 3GPP network application 1012. 3GPP network application 1012 receives the user messages and associates the user messages with user slice 432. 3GPP network application 1012 routes the user messages from user slice 432 to UE 401 over the second N1 which traverses the N2 and NWu that traverse N3IWF 421 and non-3GPP access node 411. 3GPP UE proxy 505 receives the user messages over the second N1 for user slice 432 and responsively associates the user messages with user slice 432. 3GPP UE proxy 505 transfers the user messages to user application 1002.

The wireless data network circuitry described above comprises computer hardware and software that form special-purpose network circuitry to serve a non-3GPP UE over a 3GPP communication network. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve a non-3GPP UE over a 3GPP communication network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a data communication system to serve a User Equipment (UE) over a Third Generation Partnership Project (3GPP) network core, the method comprising:
    a 3GPP UE client exchanging authentication data with a 3GPP network core over a non-3GPP link;
    the 3GPP network core exchanging the authentication data with the 3GPP UE client over the non-3GPP link, and in response, authenticating the 3GPP UE client, selecting a network slice for the 3GPP UE client, and establishing an N1 link for the network slice over the non-3GPP link;
    the 3GPP UE client exchanging network signaling with the 3GPP network core for the network slice over the N1 link;
    the 3GPP UE client exchanging additional authentication data with the 3GPP network core over the non-3GPP link;
    the 3GPP network core exchanging the additional authentication data with the 3GPP UE client over the non-3GPP link, and in response, selecting another network slice for the 3GPP UE client, and establishing another N1 link for the other network slice over the non-3GPP link; and
    the 3GPP UE client exchanging additional network signaling with the 3GPP network core for the other network slice over the other N1 link.

2. The method of claim 1 further comprising:
    the 3GPP UE client exchanging user data for the network slice with the 3GPP network core over the non-3GPP link; and
    the 3GPP UE client exchanging additional user data for the other network slice with the 3GPP network core over the non-3GPP link.

3. The method of claim 1 further comprising:
    the 3GPP UE client transferring a slice type to the 3GPP network core over the N1 link; and wherein,
    the 3GPP network core selecting the network slice comprises selecting the network slice based on the slice type.

4. The method of claim 1 further comprising:
    the 3GPP UE client transferring a slice type to the 3GPP network core over the N1 link and transferring another slice type to the 3GPP network core over the other N1 link; and
    the 3GPP network core selecting a Quality-of-Service (QoS) based on the slice type and signaling the 3GPP QoS to the 3GPP UE client over the N1 link and selecting another 3GPP QoS based on the other slice type and signaling the other QoS to the 3GPP UE client over the other N1 link.

5. The method of claim 1 further comprising:
    the 3GPP network core receiving a user message for the network slice and responsively transferring the data message to the 3GPP UE client over the N1 link for the network slice;
    the 3GPP UE client receiving the user message for the network slice over the N1 link for the network slice;
    the 3GPP network core receiving another user message for the other network slice and responsively transferring the other user message to the 3GPP UE client over the other N1 link for the other network slice; and
    the 3GPP UE client receiving the other user message for the other network slice over the other N1 link for the other network slice.

6. The method of claim 1 wherein:
    the 3GPP UE client exchanging the authentication data with the 3GPP network core over the non-3GPP link comprises exchanging Extensible Authentication Protocol (EAP) data with a Non-3GPP Interworking Function (N3IWF);
    the 3GPP network core exchanging the authentication data with the 3GPP UE client over the non-3GPP link and authenticating the 3GPP UE client comprises the N3IWF exchanging the EAP data with the 3GPP UE client over the non-3GPP link and authenticating the 3GPP UE client;
    the 3GPP UE client exchanging the other authentication data with the 3GPP network core over the non-3GPP link comprises exchanging other EAP data with the N3IWF; and
    the 3GPP network core exchanging the other authentication data with the 3GPP UE client over the non-3GPP link and authenticating the 3GPP UE client comprises the N3IWF exchanging the other EAP data with the 3GPP UE client over the non-3GPP link and authenticating the 3GPP UE client.

7. The method of claim 1 wherein:
    the 3GPP UE client exchanging the authentication data with the 3GPP network core over the non-3GPP link comprises exchanging Extensible Authentication Protocol (EAP) data with a 3GPP Evolved Packet Data Gateway (ePDG);

the 3GPP network core exchanging the authentication data with the 3GPP UE client over the non-3GPP link and authenticating the 3GPP UE client comprises the 3GPP ePDG exchanging the EAP data with the 3GPP UE client over the non-3GPP link and authenticating the 3GPP UE client;

the 3GPP UE client exchanging the other authentication data with the 3GPP network core over the non-3GPP link comprises exchanging other EAP data with the 3GPP ePDG; and the 3GPP network core exchanging the other authentication data with the 3GPP UE client over the non-3GPP link and authenticating the 3GPP UE client comprises the 3GPP ePDG exchanging the other EAP data with the 3GPP UE client over the non-3GPP link and authenticating the 3GPP UE client.

8. The method of claim 1 wherein:

the 3GPP UE client exchanging the authentication data with the 3GPP network core over the non-3GPP link comprises exchanging Extensible Authentication Protocol (EAP) data with a 3GPP Trusted Network Gateway Function (TNGF);

the 3GPP network core exchanging the authentication data with the 3GPP UE client over the non-3GPP link and authenticating the 3GPP UE client comprises the 3GPP TNGF exchanging the EAP data with the 3GPP UE client over the non-3GPP link and authenticating the 3GPP UE client;

the 3GPP UE client exchanging the other authentication data with the 3GPP network core over the non-3GPP link comprises exchanging other EAP data with the 3GPP TNGF; and the 3GPP network core exchanging the other authentication data with the 3GPP UE client over the non-3GPP link and authenticating the 3GPP UE client comprises the 3GPP TNGF exchanging the other EAP data with the 3GPP UE client over the non-3GPP link and authenticating the 3GPP UE client.

9. The method of claim 1 wherein:

the 3GPP UE client exchanging the authentication data with the 3GPP network core over the non-3GPP link comprises exchanging Extensible Authentication Protocol (EAP) data with an Institute of Electrical and Electronic Engineers (IEEE) 802.3 Trusted Network Access Node (ENET TNAN);

the 3GPP network core exchanging the authentication data with the 3GPP UE client over the non-3GPP link and authenticating the 3GPP UE client comprises the ENET TNAN exchanging the EAP data with the 3GPP UE client over the non-3GPP link and authenticating the 3GPP UE client;

the 3GPP UE client exchanging the other authentication data with the 3GPP network core over the non-3GPP link comprises exchanging other EAP data with the ENET TNAN; and the 3GPP network core exchanging the other authentication data with the 3GPP UE client over the non-3GPP link and authenticating the 3GPP UE client comprises the ENET TNAN exchanging the other EAP data with the 3GPP UE client over the non-3GPP link and authenticating the 3GPP UE client.

10. The method of claim 1 wherein:

the 3GPP UE client exchanging the authentication data with the 3GPP network core over the non-3GPP link comprises exchanging Extensible Authentication Protocol (EAP) data with an Institute of Electrical and Electronic Engineers (IEEE) 802.11 Trusted Network Access Node (WIFI TNAN);

the 3GPP network core exchanging the authentication data with the 3GPP UE client over the non-3GPP link and authenticating the 3GPP UE client comprises the WIFI TNAN exchanging the EAP data with the 3GPP UE client over the non-3GPP link and authenticating the 3GPP UE client;

the 3GPP UE client exchanging the other authentication data with the 3GPP network core over the non-3GPP link comprises exchanging other EAP data with the WIFI TNAN; and the 3GPP network core exchanging the other authentication data with the 3GPP UE client over the non-3GPP link and authenticating the 3GPP UE client comprises the WIFI TNAN exchanging the other EAP data with the 3GPP UE client over the non-3GPP link and authenticating the 3GPP UE client.

11. A data communication system configured to serve a User Equipment (UE) over a Third Generation Partnership Project (3GPP) network core, the data communication system comprising:

a 3GPP UE client configured to exchange authentication data with a 3GPP network core over a non-3GPP link;

the 3GPP network core configured to exchange the authentication data with the 3GPP UE client over the non-3GPP link, and in response, authenticate the 3GPP UE client, select a network slice for the 3GPP UE client, and establish an N1 link for the network slice over the non-3GPP link;

the 3GPP UE client configured to exchange network signaling with the 3GPP network core for the network slice over the N1 link and exchange user data with the 3GPP network core for the network slice over the non-3GPP link;

the 3GPP UE client configured to exchange additional authentication data with the 3GPP network core over the non-3GPP link;

the 3GPP network core configured to exchange the additional authentication data with the 3GPP UE client over the non-3GPP link, and in response, select another network slice for the 3GPP UE client, and establish another N1 link for the other network slice over the non-3GPP link; and the 3GPP UE client configured to exchange additional network signaling with the 3GPP network core for the other network slice over the other N1 link and exchange additional user data with the 3GPP network core for the other network slice over the non-3GPP link.

12. The data communication system of claim 11 further comprising:

the 3GPP UE client configured to exchange user data for the network slice with the 3GPP network core over the non-3GPP link; and the 3GPP UE client configured to exchange additional user data for the other network slice with the 3GPP network core over the non-3GPP link.

13. The data communication system of claim 11 further comprising:

the 3GPP UE client configured to transfer a slice type to the 3GPP network core over the N1 link; and wherein, the 3GPP network core is configured to select the network slice comprises the 3GPP network core configured to select the network slice based on the slice type.

14. The data communication system of claim 11 further comprising:

the 3GPP UE client configured to transfer a slice type to the 3GPP network core over the N1 link and transfer another slice type to the 3GPP network core over the other N1 link; and the 3GPP network core configured to select a Quality-of-Service (QoS) based on the slice type and signal the 3GPP QoS to the 3GPP UE client over the N1 link and select another 3GPP QoS based on the other slice type and signal the other QoS to the 3GPP UE client over the other N1 link.

15. The data communication system of claim 11 further comprising:
   the 3GPP network core configured to receive a user message for the network slice and responsively transfer the data message to the 3GPP UE client over the N1 link for the network slice;
   the 3GPP UE client configured to receive the user message for the network slice over the N1 link for the network slice;
   the 3GPP network core configured to receive another user message for the other network slice and responsively transferring the other user message to the 3GPP UE client over the other N1 link for the other network slice; and
   the 3GPP UE client configured to receive the other user message for the other network slice over the other N1 link for the other network slice.

16. The data communication system of claim 11 wherein:
   the 3GPP UE client is configured to exchange the authentication data with the 3GPP network core over the non-3GPP link comprises the 3GPP client configured to exchange Extensible Authentication Protocol (EAP) data with a non-3GPP Interworking Function (N3IWF);
   the 3GPP network core is configured to exchange the authentication data with the 3GPP UE client over the non-3GPP link and authenticate the 3GPP UE client comprises the N3IWF configured to exchange the EAP data with the 3GPP UE client over the non-3GPP link and authenticate the 3GPP UE client;
   the 3GPP UE client is configured to exchange the other authentication data with the 3GPP network core over the non-3GPP link comprises the 3GPP client configured to exchange other EAP data with the N3IWF; and
   the 3GPP network core is configured to exchange the other authentication data with the 3GPP UE client over the non-3GPP link comprises the N3IWF configured to exchange the other EAP data with the 3GPP UE client over the non-3GPP link.

17. The data communication system of claim 11 wherein:
   the 3GPP UE client is configured to exchange the authentication data with the 3GPP network core over the non-3GPP link comprises the 3GPP client configured to exchange Extensible Authentication Protocol (EAP) data with a 3GPP Evolved Packet Data Gateway (ePDG);
   the 3GPP network core is configured to exchange the authentication data with the 3GPP UE client over the non-3GPP link and authenticate the 3GPP UE client comprises the 3GPP ePDG configured to exchange the EAP data with the 3GPP UE client over the non-3GPP link and authenticate the 3GPP UE client;
   the 3GPP UE client is configured to exchange the other authentication data with the 3GPP network core over the non-3GPP link comprises the 3GPP client configured to exchange other EAP data with the 3GPP ePDG; and the 3GPP network core is configured to exchange the other authentication data with the 3GPP UE client over the non-3GPP link comprises the 3GPP ePDG configured to exchange the other EAP data with the 3GPP UE client over the non-3GPP link.

18. The data communication system of claim 11 wherein:
   the 3GPP UE client is configured to exchange the authentication data with the 3GPP network core over the non-3GPP link comprises the 3GPP client configured to exchange Extensible Authentication Protocol (EAP) data with a 3GPP Trusted Network Gateway Function (TNGF);
   the 3GPP network core is configured to exchange the authentication data with the 3GPP UE client over the non-3GPP link and authenticate the 3GPP UE client comprises the 3GPP TNGF configured to exchange the EAP data with the 3GPP UE client over the non-3GPP link and authenticate the 3GPP UE client;
   the 3GPP UE client is configured to exchange the other authentication data with the 3GPP network core over the non-3GPP link comprises the 3GPP client configured to exchange other EAP data with the 3GPP TNGF; and
   the 3GPP network core is configured to exchange the other authentication data with the 3GPP UE client over the non-3GPP link comprises the 3GPP TNGF configured to exchange the other EAP data with the 3GPP UE client over the non-3GPP link.

19. The data communication system of claim 11 wherein:
   the 3GPP UE client is configured to exchange the authentication data with the 3GPP network core over the non-3GPP link comprises the 3GPP client configured to exchange Extensible Authentication Protocol (EAP) data with an Institute of Electrical and Electronic Engineers (IEEE) 802.3 Trusted Network Access Node (ENET TNAN);
   the 3GPP network core is configured to exchange the authentication data with the 3GPP UE client over the non-3GPP link and authenticate the 3GPP UE client comprises the ENET TNAN configured to exchange the EAP data with the 3GPP UE client over the non-3GPP link and authenticate the 3GPP UE client;
   the 3GPP UE client is configured to exchange the other authentication data with the 3GPP network core over the non-3GPP link comprises the 3GPP client configured to exchange other EAP data with the ENET TNAN; and
   the 3GPP network core is configured to exchange the other authentication data with the 3GPP UE client over the non-3GPP link comprises the ENET TNAN configured to exchange the other EAP data with the 3GPP UE client over the non-3GPP link.

20. The data communication system of claim 11 wherein:
   the 3GPP UE client is configured to exchange the authentication data with the 3GPP network core over the non-3GPP link comprises the 3GPP client configured to exchange Extensible Authentication Protocol (EAP) data with an Institute of Electrical and Electronic Engineers (IEEE) 802.11 Trusted Network Access Node (WIFI TNAN);
   the 3GPP network core is configured to exchange the authentication data with the 3GPP UE client over the non-3GPP link and authenticate the 3GPP UE client comprises the WIFI TNAN configured to exchange the EAP data with the 3GPP UE client over the non-3GPP link and authenticate the 3GPP UE client;

the 3GPP UE client is configured to exchange the other authentication data with the 3GPP network core over the non-3GPP link comprises the 3GPP client configured to exchange other EAP data with the WIFI TNAN; and the 3GPP network core is configured to exchange the other authentication data with the 3GPP UE client over the non-3GPP link comprises the WIFI TNAN configured to exchange the other EAP data with the 3GPP UE client over the non-3GPP link.

* * * * *